(12) United States Patent
Yoshida

(10) Patent No.: US 6,185,111 B1
(45) Date of Patent: Feb. 6, 2001

(54) SWITCHING POWER SUPPLY APPARATUS

(75) Inventor: Koji Yoshida, Ikoma (JP)

(73) Assignee: Matsushita Electric Industrial Co., Ltd., Osaka-fu (JP)

( * ) Notice: Under 35 U.S.C. 154(b), the term of this patent shall be extended for 0 days.

(21) Appl. No.: 09/528,933

(22) Filed: Mar. 20, 2000

(30) Foreign Application Priority Data

Mar. 25, 1999 (JP) ................................................. 11-081129

(51) Int. Cl.$^7$ ................................................. H02M 3/335
(52) U.S. Cl. ................................................. 363/17; 363/98
(58) Field of Search ................................. 363/16, 17, 95, 363/97, 98, 131, 132

(56) References Cited

U.S. PATENT DOCUMENTS

| | | |
|---|---|---|
| 4,953,068 | 8/1990 | Henze . |
| 5,231,563 * | 7/1993 | Jitaru ........................................ 363/98 |
| 5,438,497 * | 8/1995 | Jain ........................................ 363/17 |
| 5,541,827 | 7/1996 | Allfather . |
| 5,963,436 * | 10/1999 | Yoshida ................................... 363/17 |
| 6,038,142 * | 3/2000 | Fraidlin et al. ........................ 363/17 |

FOREIGN PATENT DOCUMENTS

| | | |
|---|---|---|
| 09074745 | 3/1997 | (JP) . |
| 09149636 | 6/1997 | (JP) . |

* cited by examiner

Primary Examiner—Matthew Nguyen
(74) Attorney, Agent, or Firm—Akin, Gump, Strauss, Hauer & Feld, L.L.P.

(57) ABSTRACT

A switching power supply apparatus is provided with a series circuit comprising a first switching section and a second switching section that repeat on/off operation complementarily, and a series circuit comprising a third switching section and a fourth switching section that repeat on/off operation complementarily, both series circuits are connected across an input power supply. A transformer includes a primary winding and secondary windings, and the primary winding is bridge-connected to the above-mentioned switching sections. The switching power supply apparatus is further provided with fifth and sixth switching sections that turn on/off in synchronization with the operation of the second and fourth switching sections, respectively to rectify the voltages generating at the secondary windings of the transformer. The second switching section and the fourth switching section are controlled to short-circuit the transformer in a period during which both the first switching section and the second switching section are off.

40 Claims, 7 Drawing Sheets

US 6,185,111 B1

SWITCHING POWER SUPPLY APPARATUS

FIELD OF THE INVENTION

The present invention relates to a switching power supply apparatus for supplying a stabilized DC voltage to industrial and consumer-oriented electronic apparatuses.

BACKGROUND OF THE INVENTION

In recent years, switching power supply apparatuses have been required to be more compact, efficient and reliable as electronic apparatuses in which switching power supply apparatuses become less expensive, more compact, higher in performance and more energy-efficient. A switching power supply apparatus basically comprises an inverter that turns on and off an input DC voltage at a high frequency to covert it into a high-frequency AC voltage, a transformer for converting AC currents and voltages and for keeping insulation between input and output, and a rectifying and smoothing circuit for converting an alternating current into a direct current. The output voltage is regulated by changing the on/off ratios of the switching devices in the switching sections of the inverter section. Since the transformer is driven at a high frequency, it can be made compact. In addition, the transformer has an extremely low loss because of on/off operation. For these reasons, the switching power supply apparatus is characterized to be made compact and highly efficient.

However, in reality, there is no ideal switching device. In a semiconductor switch used in a switching section or a rectifying circuit, an on-voltage occurs due to the resistance of the semiconductor switch at its on-period, thereby causing a loss. Since a high-speed on/off characteristic is usually required for a rectifying and smoothing circuit in particular, high-speed diodes are used for the circuit. However, the high-speed diode has the disadvantage of requiring a particularly high on-voltage, thereby reducing efficiency. In recent years, MOS FETs have been improved greatly in performance, and attempts have been made to improve their efficiency by using such MOS FETs as rectifying devices and by carrying out synchronous rectification described below.

Half-bridge-type and full-bridge-type circuits have been used for high-power switching power supply apparatuses. FIG. 6 shows a circuit diagram of a conventional example of a switching power supply apparatus comprising a combination of a full-bridge converter and synchronous rectifying devices. Referring to FIG. 6, the voltage value of an input DC power supply 1 is assumed to be "Vin". A series circuit comprising a first switching section 69 and a second switching section 70 is connected across input terminals 2a and 2b. A series circuit comprising a third switching section 71 and a fourth switching section 72 is also connected across the input terminals 2a and 2b. A transformer 73 has a primary winding 73a, a first secondary winding 73b, a second secondary winding 73c, a first driving winding 73d and a second driving winding 73e. The ratio of the number of turns of the above-mentioned five windings is represented by N:1:1:N':N' (N is a positive number). One terminal of the primary winding 73a is connected to the connection point of the first switching section 69 and the second switching section 70, and the other terminal is connected to the connection point of the third switching section 71 and the fourth switching section 72.

The cathode of a first rectifying diode 74 and the cathode of a second rectifying diode 75 are connected to each other, and their anodes are connected to the first secondary winding 73b and the second secondary winding 73c of the transformer 73, respectively. A fifth switching section 76 is connected in parallel with the first rectifying diode 74, thereby forming a synchronous rectifying circuit. By connecting the fifth switching section 76, i.e., a switching device, the on-voltage of which is lower than that of the first rectifying diode 74, in parallel with the first rectifying diode 74, the loss in this configuration can be made lower than that in the case when only the rectifying diode 74 is used. The fifth switching section 76 operates so as to turn on only when a positive voltage generates at the first driving winding 73d of the transformer 73. A sixth switching section 77 is connected in parallel with the second rectifying diode 75. The sixth switching section 77 and the second rectifying diode 75 operate so that the sixth switching section 77 turns on only when a positive voltage generates at the second driving winding 73e of the transformer 73. This forms a synchronous rectifying circuit.

An inductance device 16 is connected in series with a smoothing capacitor 17. One terminal of this series circuit is connected to the connection point of the first secondary winding 73b and the second secondary winding 73c, and the other terminal is connected to the connection point of the first rectifying diode 74 and the second rectifying diode 75. Output terminals 18a and 18b are connected across both terminals of the smoothing capacitor 17. A load 19 is connected across the output terminals 18a and 18b, and consumes electric power. A PWM circuit 20 detects a voltage "Vout" across the output terminals 18a and 18b, and generates a PWM signal that controls the voltage constant. A distribution circuit 21 distributes the signal supplied from the PWM circuit 20 to two channels. A first high side driving circuit 78 and a second high side driving circuit 81 are each formed of a semiconductor device or a driving transformer, and generate on/off signals for turning on/off the first switching section 69 and the third switching section 71, respectively depending on the output of the distribution circuit 21. "High side" refers to the positive side of the input DC power supply 1.

A first driving circuit 80 and a second driving circuit 79 generate on/off signals for turning on/off the second switching section 70 and the fourth switching section 72, respectively depending on the output of the distribution circuit 21. Since the first high side driving circuit 78 and the second driving circuit 79 have a common input, the first switching section 69 and the fourth switching section 72 turn on/off simultaneously.

In the same way, since the second high side driving circuit 81 and the first driving circuit 80 have a common input, the second switching section 70 and the third switching section 71 turn on/off simultaneously. A third driving circuit 82 generates an on/off signal so that the fifth switching section 76 turns on when a positive voltage generates at the first driving winding 73d of the transformer 73. In the same way, a fourth driving circuit 83 generates an on/off signal so that the sixth switching section 77 turns on when a positive voltage generates at the second driving winding 73e of the transformer 73.

The operation of the switching power supply apparatus configured as described above will be described below referring to FIG. 7a to FIG. 7j. FIG. 7a to FIG. 7j show the waveforms of the signals, voltages and currents at relevant parts. FIG. 7a shows the on/off signals G1 and G4 of the first and fourth switching sections 69 and 72, respectively. FIG. 7b shows the on/off signals G2 and G3 of the second and third switching sections 70 and 71, respectively. FIG. 7C shows the current Ip flowing through the primary winding 73a of the transformer 73. FIG. 7d shows the voltage Vp applied to the primary winding 73a of the transformer 73. FIG. 7e shows the voltage Vsr1 generated at the first driving winding 73d of the transformer 73. FIG. 7f shows the voltage Vsr2 generated at the second driving winding 73e of the transformer 73. FIG. 7g shows the current Isr1 flowing through the fifth switching section 76. FIG. 7h shows the current Isr2 flowing through the sixth switching section 77. FIG. 7i shows the current Ir1 flowing through the first rectifying diode 74. FIG. 7j shows the current Isr2 flowing through the second rectifying diode 75.

When the first switching section 69 and the fourth switching section 72 are turned on by the on/off signals of the first high side driving circuit 78 and the second driving circuit 79, respectively at time t0, the input voltage Vin is applied to the primary winding 73a of the transformer 73. When the voltage Vin is applied to the primary winding 73a of the transformer 73, voltages are induced at the windings of the transformer 73. A positive voltage Vin/N*N' is generated at the first driving winding 73d. By properly selecting a value N', the fifth switching section 76 can be turned on. The voltage Vin/N induced at the first secondary winding 73b is applied to the series circuit of the inductance device 16 and the smoothing capacitor 17 via the fifth switching section 76 having been turned on. Since the current flowing through the inductance device 16 flows through the secondary winding 73b, a current flows through the primary winding 73a. Since the fifth switching section 76 has been selected to turn on at a sufficiently low voltage, no current flows thorough the first rectifying diode 74 connected in parallel therewith. The current flows through the fifth switching section 76 used as a synchronous rectifying device, whereby the rectifying diode 74 can have a lower rectifying loss.

When the first switching section 69 and the fourth switching section 72 are turned off by the off-signals of the first high side driving circuit 78 and the second driving circuit 79, respectively at time t1, the current Ip at the primary winding of the transformer 73 becomes zero. At this time, a turn-off surge voltage is generated by the energy stored in the leak inductance parasitically existing in the transformer 73, and this causes a loss. In addition, when the second rectifying diode 75 turns on, the current flowing through the inductance device 16 is divided and flows through the first secondary winding 73b and the second secondary winding 73c of the transformer 73 because of the continuity of the magnetic flux at the transformer 73. At this time, the secondary windings 73b and 73c of the transformer 73 are short-circuited by the first rectifying diode 74 and the second rectifying diode 75 having been turned on, whereby the voltages induced at the windings of the transformer 73 become zero. The voltages at the first driving winding 73d and the second driving winding 73e also become zero, whereby the fifth switching section 76 and the sixth switching section 77 turn off. At this time, the current flowing through the inductance device 16 flows through the first rectifying diode 74 and the second rectifying diode 75.

When the second switching section 70 and the third switching section 71 are turned on simultaneously by the on-signals of the first driving circuit 80 and the second high side driving circuit 81, respectively at time t2, the input voltage Vin is applied to the primary winding 73a of the transformer 73 in the opposite direction. Voltages depending on the turn ratio are induced at the windings of the transformer 73. A positive voltage generates at the second driving winding 73e of the transformer 73 and turns on the sixth switching section 77. At the first secondary winding 73b of the transformer 73, a voltage −Vin/N generates and turns on the first rectifying diode 74. The voltage generated at the second secondary winding 73c of the transformer 73 is applied to the series circuit of the inductance device 16 and the smoothing capacitor 17 via the sixth switching section 77 having been turned on. Hereafter, the same operation as that described above is repeated in the next half period.

The output voltage is controlled as described below. The on-periods of the first switching section 69 and the fourth switching section 72 are made equal to the on-period of the second switching section 70 and the third switching section 71, and is set at Ton (=t1−t0=t3−t2). The off-period thereof is set at Toff (=t2−t1=t4−t3). When a period Ts is assumed to be Ts=Ton+Toff, since the average of the voltage applied to the inductance device 16 becomes zero in the steady state, the output voltage Vout is represented by Vout (=1/N (Ton/Ts)). Therefore, the output voltage can be controlled by changing the on/off ratios of the switching sections.

This control can turn on the fifth switching section 76 and the sixth switching section 77, which carry out synchronous rectification only in the period when a voltage is applied to the transformer 73, whereby voltage drop can be reduced and efficiency can be improved. In addition, when no voltage is generated at the first secondary winding 73b and the second secondary winding 73c of the transformer 73, the fifth switching section 76 and the sixth switching section 77 remain off. Therefore, no short-circuit current flows at the moment when a voltage is applied to the primary winding 73a of the transformer 73.

In the above-mentioned descriptions, a full-bridge converter has been taken as an example to explain. However, the above-mentioned operation can also be applied similarly to synchronous rectifying switching power supply apparatuses using half-bridge converters and push-pull converters.

In the above-mentioned conventional configuration, however, the fifth switching section 76 and the sixth switching section 77, synchronous rectifying devices, cannot be driven in the period when no voltage is generated at the transformer 73. Furthermore, currents flow through the first rectifying diode 74 and the second rectifying diode 75 in this period, thereby causing a problem of increasing a loss. Therefore, if a control is carried out so that the input voltage rises and the on-periods of the first to fourth switching sections 69, 70, 71 and 72 are shortened, the periods during which currents flow through the fifth switching section 76 and the sixth switching section 77 shorten for carrying out synchronous rectification. As a result, this causes a problem of reducing the effect of synchronous rectification. In the same way, even if the on/off signals to be applied to the first to fourth switching sections 69, 70, 71 and 72 are used, the fifth switching section 76 and the sixth switching section 77 cannot be turned on when the first to fourth switching section 69 to 72 are off.

Generally speaking, when a MOS FET is used as a synchronous rectifying device, the body diode built in the MOS FET is used frequently as a rectifying diode. However, since the body diode turns on at a higher voltage, the effect of the synchronous rectification is reduced further. In addition, if it is turned on forcibly when no voltage is generated at the transformer 73, even if the switching devices on the primary side turn on and a voltage is applied to the transformer 73, a short-circuit condition is maintained until voltages are generated at the secondary windings of the transformer 73. This causes a problem of flowing an excessively large current. Furthermore, at the turn-on time of each switching section, a capacitor parasitically existing across the switching section is short-circuited. As a result, the energy stored in this capacitor causes a loss, and a surge-like short-circuit current causes noise and reduces reliability. Moreover, at the turn-off time of the switching section, the energy stored in the leak inductance of the transformer 73 causes resonance at the capacitor parasitically existing at the switching section, thereby also causing problems of occurrence of a loss and low reliability.

Accordingly, an object of the present invention is to provide a highly efficient, reliable switching power supply apparatus.

BRIEF SUMMARY OF THE INVENTION

A switching power supply apparatus in accordance with the present invention comprises: a series circuit connected to an input power supply and comprising a first switching section and a second switching section which repeat on/off operation complementarily and have a very short rest period during which both the switching sections are off; a series circuit connected to the input power supply and comprising a third switching section and a fourth switching section that repeat on/off operation complementarily and have a very short rest period during which both the switching sections are off; and a transformer having a primary winding and also having a first secondary winding and a second secondary winding connected in series with each other, the primary winding of the transformer being connected between the connection point of the first switching section and the second switching section and the connection point of the third switching section and the fourth switching section. The switching power supply apparatus further comprises: a fifth switching section that turns on/off in synchronization with the operation of the second switching section to rectify the voltage generated at the first secondary winding of the transformer; a sixth switching section that turns on/off in synchronization with the operation of the fourth switching section to rectify the voltage generated at the second secondary winding; a smoothing circuit for smoothing the rectified voltage; a control section for controlling an output voltage by controlling the on/off ratio of the first switching section and the on/off ratio of the third switching section; and a control section for turning on the second switching section and the fourth switching section in order to short-circuit the primary winding of the transformer in a period during which both the first switching section and the second switching section are off except for the very short rest period.

According to the present invention, MOS FETs are used as switching devices for synchronous rectification. Since the MOS FET includes a diode, the voltage generated at the on-time of the MOS FET is reduced significantly by virtue of this diode. As a result, the efficiency of the power supply apparatus can be improved significantly. In addition, since each switching device performs zero-voltage switching, the energy loss does not occur at the turn-on time due to the short circuit of a parasitic capacitor, whereby it is possible to configure a highly efficient switching power supply apparatus causing less noise. Furthermore, the second switching device and the sixth switching device can be turned on/off at the same timing, and the fourth switching device and the fifth switching device can also be turned on/off at the same timing, whereby the control circuits can be configured simply.

DETAILED DESCRIPTION OF THE INVENTION

Preferred embodiments in accordance with the present invention will be described below referring to FIG. 1 to FIG. 5.

[First embodiment]

Figure 1:
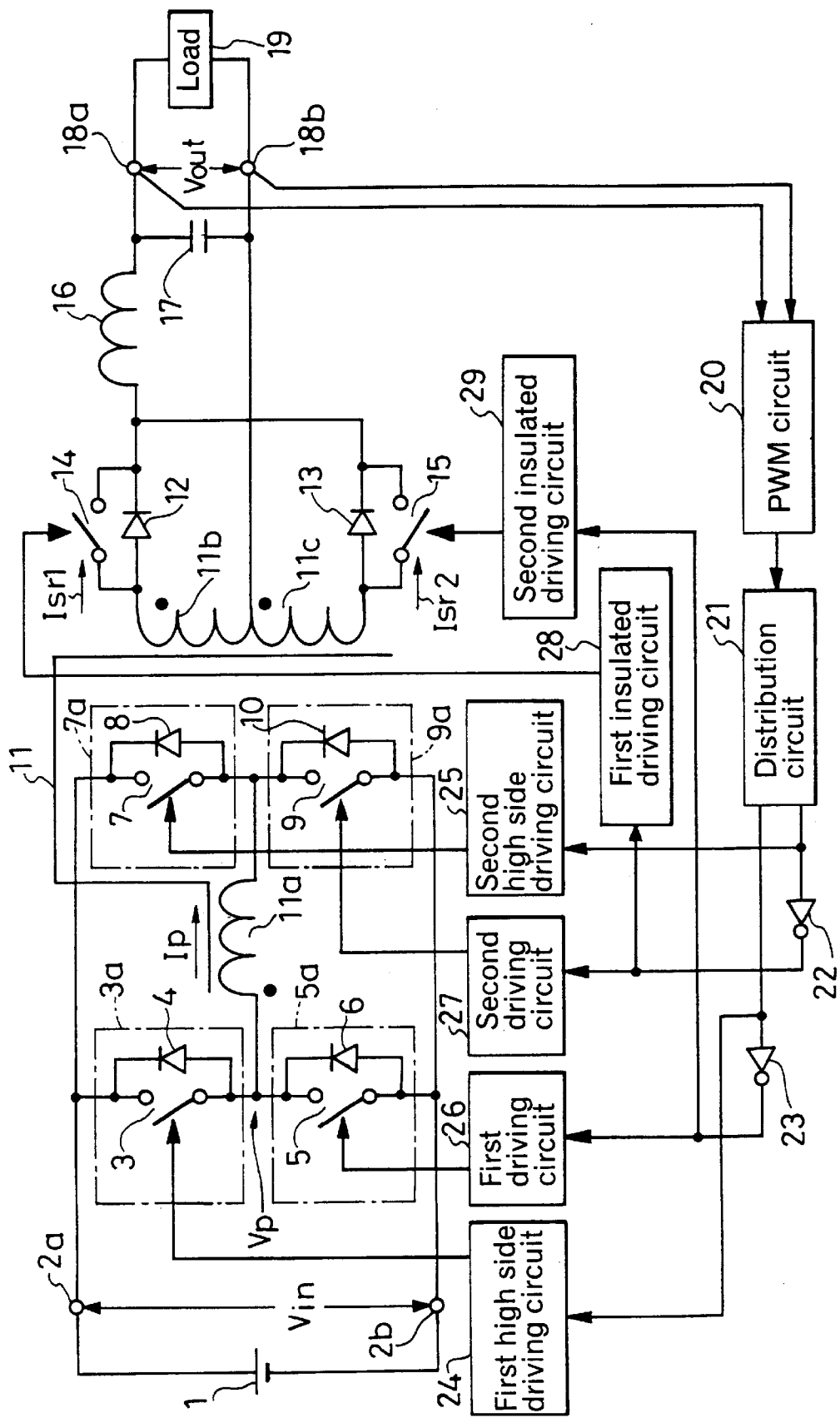
FIG. 1 is a circuit diagram of a switching power supply apparatus in accordance with a first embodiment of the present invention.

FIG. 1 is a circuit diagram of a switching power supply apparatus in accordance with a first embodiment of the present invention. Referring to FIG. 1, the voltage value of an input DC power supply 1 is assumed to be "Vin". The input DC power supply 1 is connected across input terminals 2a and 2b. A first switching element 3 and a first diode 4 constitute a first switching section 3a. A second switching element 5 and a second diode 6 constitute a second switching section 5a. The series circuit of the first switching section 3a and the second switching section 5a is connected across the input terminals 2a and 2b. A third switching element 7 and a third diode 8 constitute a third switching section 7a. A fourth switching element 9 and a fourth diode 10 constitute a fourth switching section 9a. The series circuit of the third switching section 7a and the fourth switching section 9a is also connected across the input terminals 2a and 2b. A transformer 11 has a primary winding 11a, a first secondary winding 11b and a second secondary winding 11c. The turn ratio of the windings is assumed to be N:1:1 (N is a positive number). One terminal of the primary winding 11a of the transformer 11 is connected to the connection point of the first switching section 3a and the second switching section 5a, and the other terminal thereof is connected to the connection point of the third switching section 7a and the fourth switching section 9a.

The cathode of a first rectifying diode 12 and the cathode of a second rectifying diode 13 are connected to each other, and their anodes are connected to the first secondary winding 11b and the second secondary winding 11c of the transformer 11, respectively. A fifth switching element 14 is connected in parallel with the first rectifying diode 12, thereby forming a synchronous rectifying circuit. A sixth switching element 15 is connected in parallel with the second rectifying diode 13, thereby forming another synchronous rectifying circuit. An inductance device 16 is connected in series with a smoothing capacitor 17. One terminal of this series circuit is connected to the connection point of the fifth switching element 14 and the sixth switching element 15, and the other terminal thereof is connected to the connection point of the first secondary winding 11b and the second secondary winding 11c of the transformer 11.

The voltage rectified by the fifth switching element 14 and the sixth switching element 15 is smoothened by the inductance device 16 and the smoothing capacitor 17, and delivered as an output voltage Vout. The output voltage Vout is output across output terminals 18a and 18b. The electrostatic capacitance of the smoothing capacitor 17 is sufficiently large, whereby a stabilized output voltage Vout is output across the output terminals 18a and 18b. A load 19 is connected across the output terminals 18a and 18b, and consumes electric power.

The two input terminals of a PWM circuit 20 are connected to the output terminals 18a and 18b, respectively, and the PWM circuit 20 compares the output voltage Vout with its internal reference voltage. Depending on the error amplification signal obtained as the result of the comparison, the PWM circuit 20 generates a PWM signal and applies the signal to a distribution circuit 21. The distribution circuit 21 alternately distributes and outputs the PWM signal to two outputs. A first inverter 22 and a second inverter 23 invert the two output signals of the distribution circuit 21, respectively, and output a first inverter output and a second inverter output.

A first high side driving circuit 24 and a second high side driving circuit 25 are each formed of a semiconductor device or a driving transformer, and generate control signals for turning on/off the first switching element 3 and the third switching element 7, respectively depending on the output of the distribution circuit 21. A first driving circuit 26 and a second driving circuit 27 generate signals for turning on/off the second switching element 5 and the fourth switching element 9 depending on the outputs of the second and first inverters, respectively. A first insulated driving-circuit 28 and a second insulated driving-circuit 29 have an insulating means such as a transformer, and apply on/off signals to the fifth switching element 14 and the sixth switching element 15 depending on the outputs of the first and second inverters, respectively, while maintaining insulation.

Figure 2:
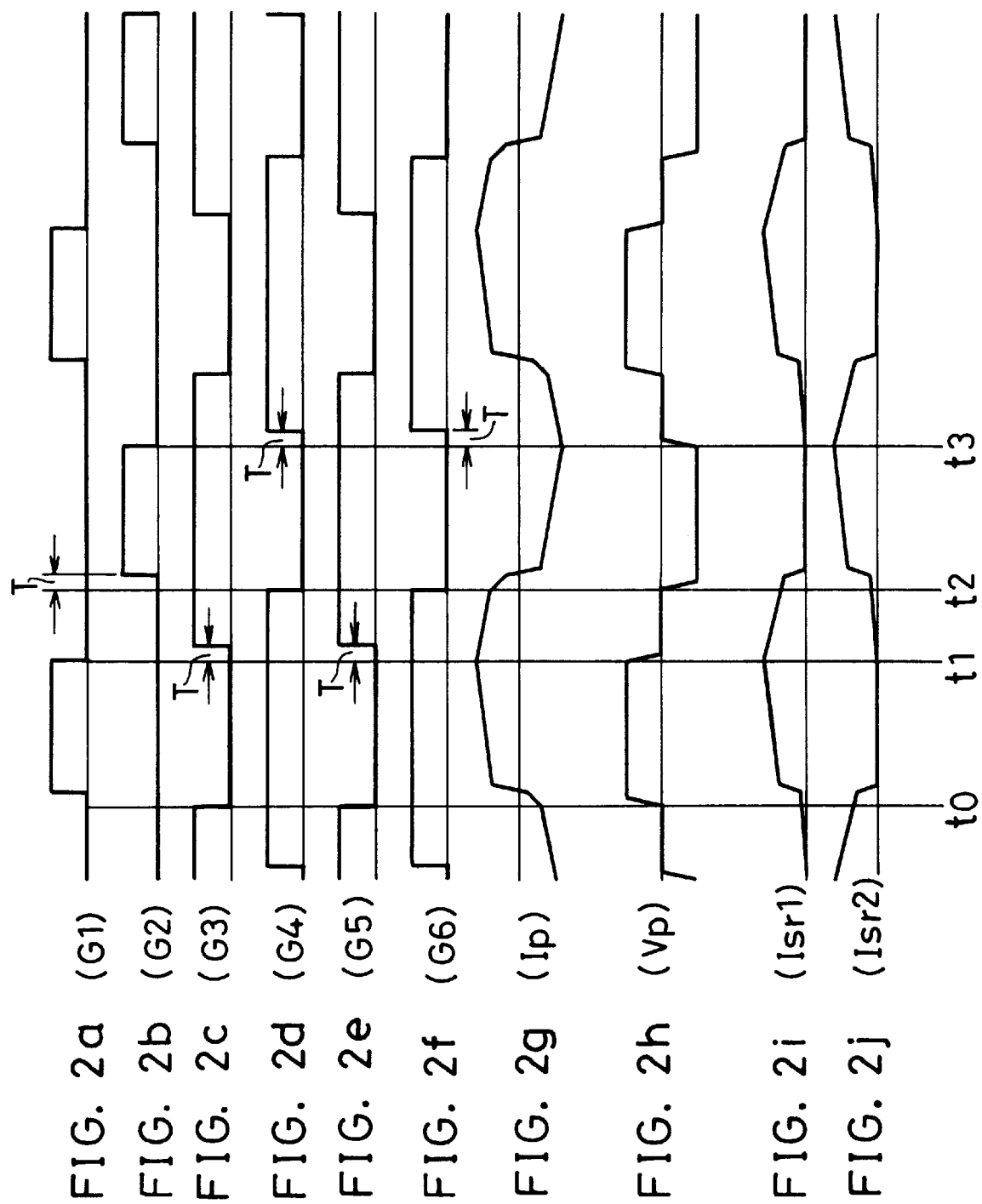
FIG. 2a to FIG. 2j show the waveforms of signals, voltages and currents at the relevant part of the first embodiment of the present invention during the operation thereof.

With the above-mentioned configuration, the second switching element 5 and the sixth switching element 15 turn on/off in synchronization with each other. The fourth switching element 9 and the fifth switching element 14 turn on/off in synchronization with each other. The on-signals output from the first and second high side driving circuits 24 and 25, the first and second driving circuits 26 and 27 and the first and second insulated driving-circuits 28 and 29 are delayed by a short time required for attaining "zero-voltage switching" described later in detail. Consequently, a very short rest period T is added to a period in which each switching device is off as shown in FIG. 2.

The operation of the synchronous rectifying circuits of the switching power supply apparatus configured above will be described below referring to FIG. 2a to FIG. 2j. FIG. 2a shows the on/off signal G1 of the first switching element 3, and FIG. 2b shows the on/off signal G2 of the second switching element 5. FIG. 2c shows the on/off signal G3 of the third switching element 7, and FIG. 2d shows the on/off signal G4 of the fourth switching element 9. FIG. 2e shows the on/off signal G5 of the fifth switching element 14, and FIG. 2f shows the on/off signal G6 of the sixth switching element 15. FIG. 2g shows the waveform of the current Ip flowing through the primary winding 11a of the transformer 11, and FIG. 2h shows the waveform of the voltage Vp applied to the primary winding 11a of the transformer 11. FIG. 2i shows the current Isr1 flowing through the fifth switching element 14, and FIG. 2j shows the current Isr2 flowing through the sixth switching element 15.

As shown in FIG. 1 and FIG. 2a to FIG. 2j, the first switching element 3 and the third switching element 7 are on/off-controlled depending on the PWM signal of the PWM circuit 20, and operate with a phase difference of 180 degrees therebetween. The second switching element 5 operates complementarily to the first switching element 3, and has the very short rest period T prior to simultaneous turning on of the first switching element 3 and the second switching element 5. In the same way, the fourth switching element 9 operates complementarily to the third switching element 7, and has the very short rest period T prior to simultaneous turning on of the third switching element 7 and the fourth switching element 9. The fifth switching element 14 turns on/off at the same timing as that of the fourth switching element 9. In the same way, the sixth switching element 15 is configured to turn on/off at the same timing as that of the second switching element 5.

When the first switching element 3, the fourth switching element 9 and the fifth switching element 14 turn on at time t0, the input voltage Vin is applied to the primary winding 11a of the transformer 11. A voltage Vin/N depending on the turn ratio of the windings of the transformer is induced at the first secondary winding 11b and the second secondary winding 11c of the transformer 11. Via the fifth switching element 14 having been turned on, the voltage Vin/N is applied to the smoothing circuit comprising the inductance device 16 and the smoothing capacitor 17. The current flowing through the inductance device 16 flows through the first secondary winding 11b via the fifth switching element 14. An induced current due to the current flowing through the first secondary winding 11b flows through the primary winding 11a of the transformer 11.

When the first switching element 3 turns off at time t1, the current flowing through the primary winding 11a of the transformer 11 continuously flows because of a leak inductance. Therefore, parasitic capacitors existing in parallel with the first switching section 3a and the second switching section 5a are charged and discharged, respectively. As a result, the applied voltage of the first switching section 3a rises, and the voltage of the second switching section 5a lowers, whereby the voltage of the primary winding 11a of the transformer 11 lowers. When the voltage of the primary winding 11a becomes zero, the second diode 6 turns on. A rest period during which both the first switching element 3 and the second switching element 5 are off is set so that the second switching element 5 turns on while the second diode 6 is on.

Consequently, the second switching element 5 is switched while the applied voltage is zero, whereby zero-voltage switching is attained and the loss occurring at the turn-on time becomes zero. When the second diode 6 or the second switching element 5 turns on, the second switching section 5a turns on, and the primary winding 11a is short-circuited. When the primary winding 11a is short-circuited, the energy stored in the leak inductance of the transformer 11 is retained, whereby the current Ip flowing through the primary winding 11a is kept constant. At this time, the voltages generating at the secondary windings 11b and 11c become zero.

The sixth switching element 15 also turns on at time t2. Since the induced voltage of the transformer 11 is zero at this time, zero-voltage turn-on operation is performed. The current flowing through the inductance device 16 continuously flows through the first secondary winding 11b via the fifth switching element 14. To flow the discharge current of the parasitic capacitor existing in parallel with the sixth switching element 15 to the second secondary winding 11c, the current of the first secondary winding 11b decreases, and the current of the primary winding 11a also decreases simultaneously. After the sixth switching element 15 turns on, the current flowing through the second secondary winding 11c continuously flows through the sixth switching element 15. At this time, the voltage applied to the smoothing circuit comprising the inductance device 16 and the smoothing capacitor 17 becomes zero.

When the fourth switching element 9 and the fifth switching element 14 turn on simultaneously at time t3, the current flowing through the fifth switching element 14 continuously flows via the rectifying diode 12 connected in parallel therewith. Therefore, the currents of all the windings of the transformer 11 remain unchanged. The capacitors parasitically existing in parallel with the third switching section 7a and the fourth switching section 9a are discharged and charged, respectively by the current Ip of the primary winding 11a of the transformer 11. As a result, the applied voltage of the fourth switching section 9a rises, and the applied voltage of the third switching section 7a lowers, and the voltage Vp applied to the primary winding 11a lowers. When the applied voltage of the third switching section 7a becomes zero, the third diode 8 turns on, and the voltage to be applied to the third switching section 7a is retained at zero. A period during which both the third switching element 7 and the fourth switching element 9 are off is set so that the third switching element 7 turns on when the applied voltage of the third switching section 7a is zero. This attains the zero-voltage switching of the third switching element 7. When the third switching element 7 or the third diode 8 turns on, the third switching section 7a turns on, whereby the second switching section 5a and the third switching section 7a turn on. As a result, the input voltage Vin is applied to the primary winding 11a in the opposite direction.

Since a voltage −Vin/N is generated at the first and second secondary windings 11b and 11c, the current flowing through the second secondary winding 11c increases abruptly, and the current flowing through the first secondary winding 11b decreases abruptly. When the current flowing through the first secondary winding 11b becomes zero, the current flowing through the first rectifying diode 12 becomes zero and thereby turns off. When the first rectifying diode 12 turns off, the voltage Vin/N generates at the first secondary winding 11b. The voltage Vin/N is applied to the series circuit of the inductance device 16 and the smoothing capacitor 17 via the sixth switching element 15 having been turned on. Next, the current Ip of the primary winding 11a is inverted abruptly. Since the operation in the next half period is similar to that described above, the explanation of the operation is omitted.

The output voltage applied to the inductance device 16 is controlled depending on the on/off ratios of the first switching section 3a and the second switching section 5a just as in the case of the conventional full-bridge converter.

The use of MOS FETs is recommendable for the switching elements 14 and 15 of the synchronous rectification. Since the MOS FET includes a diode therein, the voltage generated at the on-time of the MOS FET semiconductor device is far lower than that in the case of a high-speed rectifying diode. In the present embodiment, the periods during which currents flow through the first rectifying diode 12 and the second rectifying diode 13 become short, whereby the effect of synchronous rectification is enhanced. The turn-off timing of the fifth switching element 14 is made identical to that of the fourth switching element 9. However, the turn-off timing of the first rectifying diode 12 is delayed further due to the influence of the leak induction of the transformer as a load current is larger. Therefore, when the turn-off timing of the fifth switching element 14 is delayed depending on the load current, the conduction period of the first rectifying diode 12 can be shortened, whereby it is needless to say that the effect of improving the efficiency is enhanced. Furthermore, even if the diodes built in the MOS FETs are used instead of the rectifying diodes 12 and 13, the efficiency is hardly lowered, whereby the efficiency of the power supply apparatus can be improved significantly. In addition, since the switching elements 3, 5, 7 and 9 perform zero-voltage switching, the energy loss does not occur at the turn-on time due to the short circuit of the parasitic capacitors. Moreover, the energy stored in the leak inductance of the transformer is maintained by the short circuit of the coils of the transformer and effectively used for zero-voltage switching. Therefore, no wasteful energy loss occurs, whereby it is possible to configure a highly efficient switching power supply apparatus. Besides, in the present configuration, the second switching element 5 and the sixth switching element 15 can be turned on/off at the same timing, and the fourth switching element 9 and the fifth switching element 14 can be turned on/off at the same timing, whereby the control circuits can be configured simply. The rest period T is not required to be the same at all times, but may have a different value for each switching device.

[Second embodiment]

Figure 3:
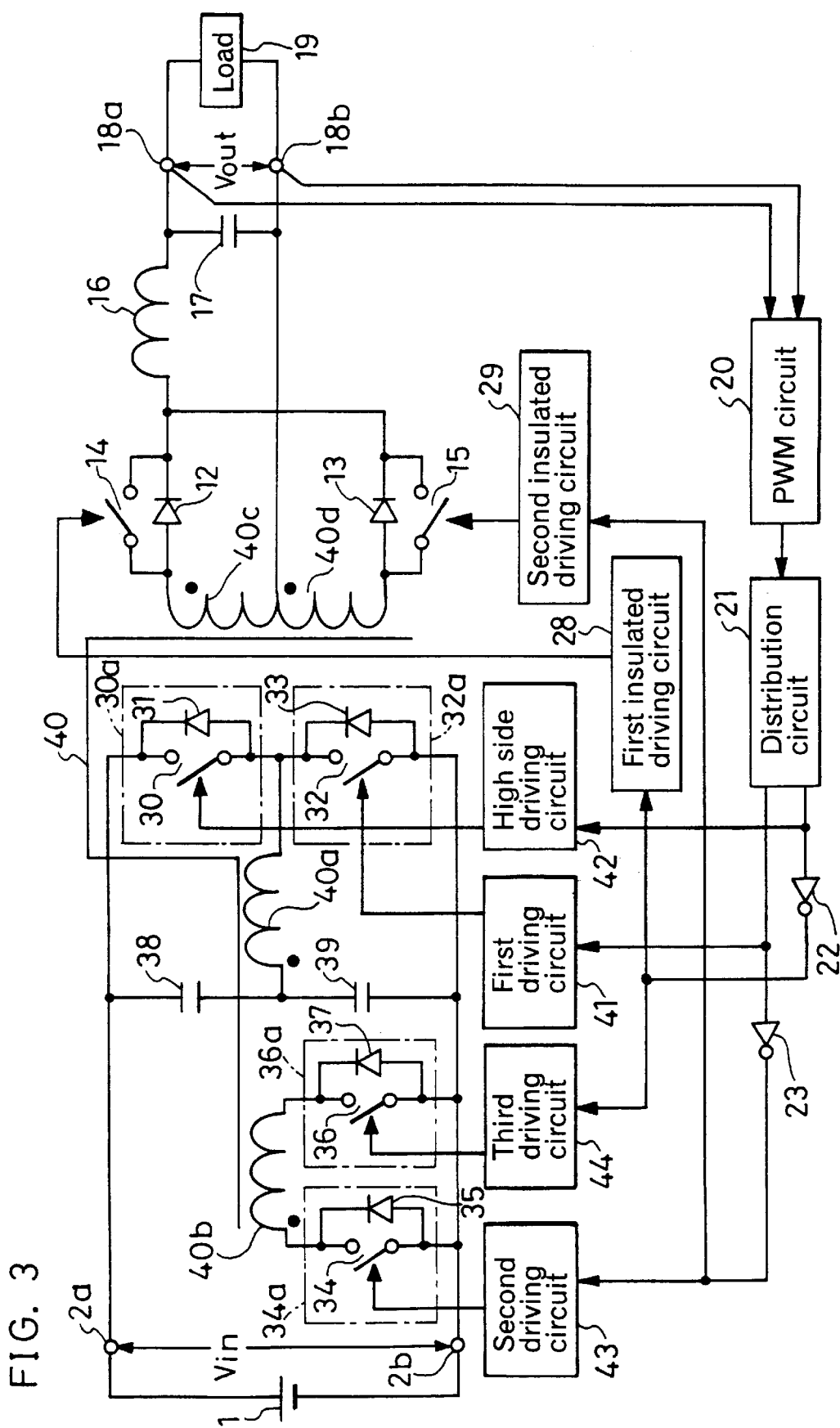
FIG. 3 is a circuit diagram of a switching power supply apparatus in accordance with a second embodiment of the present invention.

FIG. 3 is a circuit diagram of a switching power supply apparatus in accordance with a second embodiment of the present invention. This power supply apparatus uses a known half-bridge converter comprising first and second switching sections 30a and 32a.

Referring to FIG. 3, the voltage value of an input DC power supply 1 is assumed to be Vin. The input DC power supply 1 is connected across input terminals 2a and 2b. A first switching device 30 and a first diode 31 constitute the first switching section 30a. A second switching device 32 and a second diode 33 constitute the second switching section 32a. The series circuit of the first switching section 30a and the second switching section 32a is connected across the input terminals 2a and 2b. A third switching device 34 and a third diode 35 constitute a third switching section 34a. A fourth switching device 36 and a fourth diode 37 constitute a fourth switching section 36a. The series circuit of a first capacitor 38 and a second capacitor 39 is connected across the input terminals 2a and 2b.

A transformer 40 has a primary winding 40a, an auxiliary winding 40b, a first secondary winding 40c and a second secondary winding 40d. The turn ratio of the windings is N:N:1:1. One terminal of the primary winding 40a is connected to the connection point of the first switching section 30a and the second switching section 32a, and the other terminal is connected to the connection point of the first capacitor 38 and the second capacitor 39. The auxiliary winding 40b is connected across both the terminals of the series circuit of the third switching section 34a and the fourth switching section 36a.

The cathode of a first rectifying diode 12 and the cathode of a second rectifying diode 13 are connected to each other, and their anodes are connected to the terminals of the first secondary winding 40c and the second secondary winding 40d, respectively. A fifth switching element 14 is connected in parallel with the first rectifying diode 12, thereby forming a synchronous rectifying circuit. A sixth switching element 15 is connected in parallel with the second rectifying diode 13, thereby forming another synchronous rectifying circuit. An inductance device 16 is connected in series with a smoothing capacitor 17. One terminal of this series circuit is connected to the connection point of the fifth switching element 14 and the sixth switching element 15, and the other terminal is connected to the connection point of the first secondary winding 40c and the second secondary winding 40d of the transformer 40. The voltage rectified by the fifth switching element 14 and the sixth switching element 15 is smoothened by the inductance device 16 and the smoothing capacitor 17, and this voltage is output as an output voltage across output terminals 18a and 18b. The electrostatic capacitance of the smoothing capacitor 17 is sufficiently large, whereby a stabilized output voltage "Vout" is output across the output terminals 18a and 18b.

A load 19 is connected across the output terminals 18a and 18b, and consumes electric power. The two input terminals of a PWM circuit 20 are connected to the output terminals 18a and 18b, respectively, and the PWM circuit 20 compares the output voltage Vout with its internal reference voltage. Depending on the error amplification signal obtained as the result of the comparison, the PWM circuit 20 generates a PWM signal and applies the signal to a distribution circuit 21. The distribution circuit 21 alternately distributes and outputs the PWM signal to two outputs. A first inverter 22 and a second inverter 23 invert the two output signals of the distribution circuit 21, respectively, and output the signals as a first inverter output and a second inverter output. A first driving circuit 41 generates a signal for turning on/off the second switching device 32 depending on the output of the distribution circuit 21. A high side driving circuit 42 is formed of a semiconductor device or a driving transformer, and generates a control signal for turning on/off the first switching device 30 depending on the output of the distribution circuit 21. A second driving circuit 43 and a third driving circuit 44 generate signals for turning on/off the third switching device 34 and the fourth switching device 36 depending on the outputs of the second and first inverters 23 and 22, respectively. A first insulated driving-circuit 28 and a second insulated driving-circuit 29 generate signals for turning on/off the fifth switching element 14 and the sixth switching element 15 depending on the outputs of the first and second inverters 22 and 23, respectively, and apply the signals while being insulated by a transformer or the like. The on-signals output from the first driving circuit 41, the high side driving circuit 42, the second driving circuit 43, the third driving circuit 44, the first insulated driving-circuit 28 and the second insulated driving-circuit 29 have a delay time required for attaining zero-voltage switching described later. This includes a very short rest period T during which each switching device is off.

The switching power supply apparatuseshown in FIG. 3 differs from that of the first embodiment in the following points. The basic converter for applying a rectangular wave voltage to the transformer 40 is a half-bridge type, and controls the output voltage by the PWM control of the first switching section 30a and the second switching section 32a. The third switching section 34a and the fourth switching section 36a are used as the switching sections for short-circuiting the auxiliary winding 40b. The circuit is configured so that the third switching section 34a and the fourth switching section 36a are insulated from the first switching section 30a and the second switching section 32a. Except for the different points, the configurations and basic operation of the present invention are the same as those of the synchronous-rectification-type switching power supply apparatus of the first embodiment, and the descriptions of these are omitted to prevent overlaps.

The present circuit is particularly characterized in that the auxiliary winding 40b of the transformer 40 is short-circuited. The circuit is configured so that the auxiliary winding 40b of the transformer 40, the third switching section 34a and the fourth switching section 36a can be insulated. Therefore, in FIG. 3, the third switching section 34a and the fourth switching section 36a are connected to the second driving circuit 43 and the third driving circuit 44, respectively so that the third switching section 34a and the fourth switching section 36a can be on/off-controlled easily. The voltage applied to the third switching section 34a and the fourth switching section 36a is half of the input voltage Vin. In addition, the third switching device 34 and the sixth switching element 15 can be turned on/off at the same timing, and the fourth switching device 36 and the fifth switching element 14 can also be turned on/off at the same timing, whereby the control circuits can be configured simply. Although the auxiliary winding 40b is independent of the primary winding 40a, the primary winding can be used in place of the auxiliary winding 40b. In this case, the second driving circuit 43 and the third driving circuit 44 require other separate driving circuits, although the auxiliary winding 40b is not required.

[Third embodiment]

Figure 4:
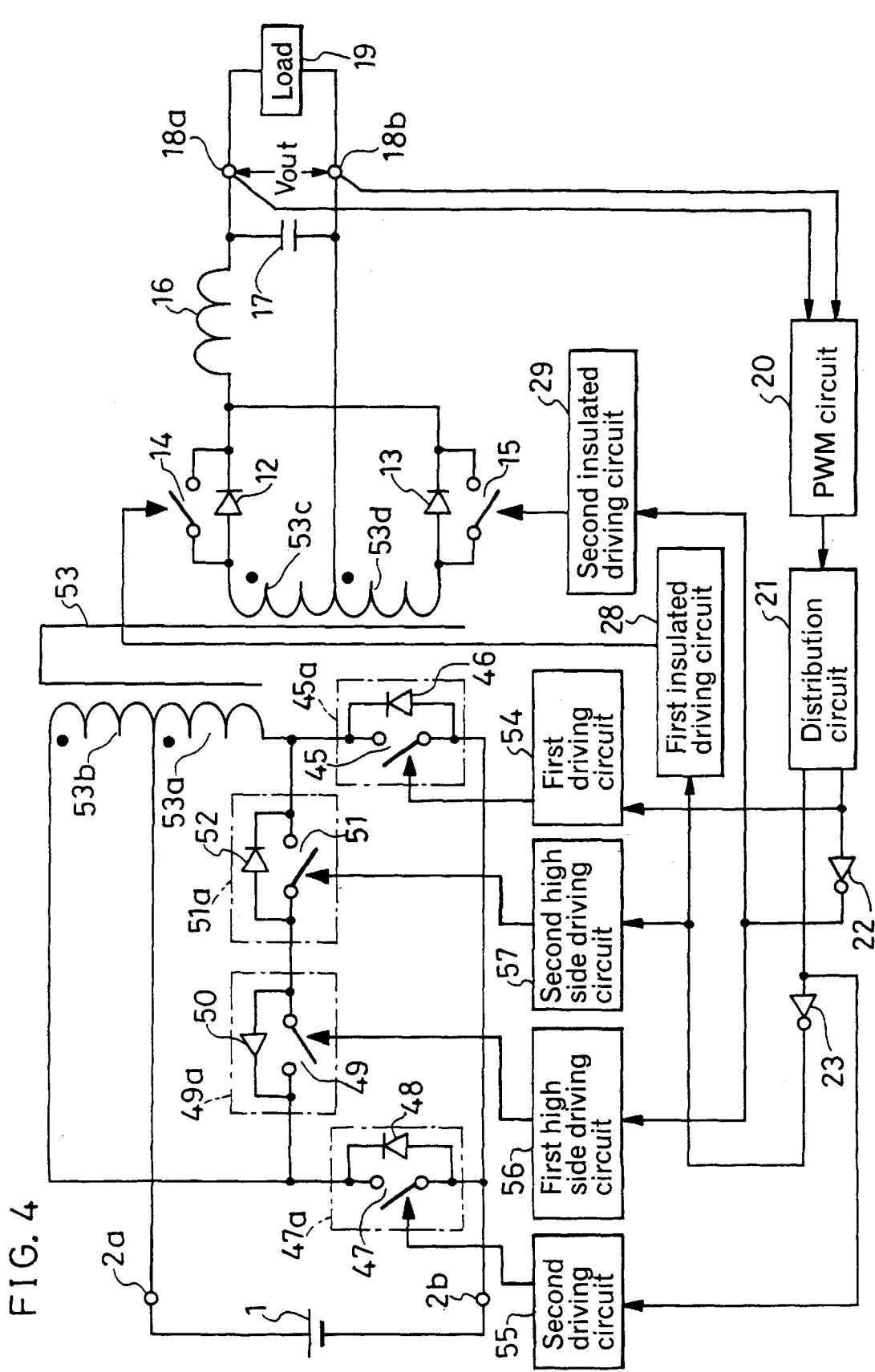
FIG. 4 is a circuit diagram of a switching power supply apparatus in accordance with a third embodiment of the present invention.

FIG. 4 is a circuit diagram of a switching power supply apparatus in accordance with a third embodiment of the present invention. This power supply apparatus uses a known push-pull converter.

Referring to FIG. 4, the voltage value of an input DC power supply 1 is assumed to be Vin. The input DC power supply 1 is connected across input terminals 2a and 2b. A first switching device 45 and a first diode 46 constitute a first switching section 45a. A second switching device 47 and a second diode 48 constitute a second switching section 47a. A third switching device 49 and a third diode 50 constitute a third switching section 49a. A fourth switching device 51 and a fourth diode 52 constitute a fourth switching section 51a.

A transformer 53 has a first primary winding 53a, a second primary winding 53b, a first secondary winding 53c and a second secondary winding 53d. The turn ratio of the windings is assumed to be N:N:1:1. The series circuit of the first switching section 45a and the first primary winding 53a is connected across the input terminals 2a and 2b. The series circuit of the second switching section 47a and the second primary winding 53b is also connected across the input terminals 2a and 2b. The third switching section 49a and the fourth switching section 51a are connected in series with each other. One terminal of this series circuit is connected to the connection point of the first primary winding 53a of the transformer 53 and the first switching section 45a, and the other terminal is connected to the connection point of the second primary winding 53b of the transformer 53 and the second switching section 47a.

The cathode of a first rectifying diode 12 and the cathode of a second rectifying diode 13 are connected to each other, and their anodes are connected to the terminals of the first secondary winding 53c and the second secondary winding 53d, respectively. A fifth switching element 14 is connected in parallel with the first rectifying diode 12, thereby forming a synchronous rectifying circuit. A sixth switching element 15 is connected in parallel with the second rectifying diode 13, thereby forming another synchronous rectifying circuit. An inductance device 16 is connected in series with a smoothing capacitor 17. One terminal of this series circuit is connected to the connection point of the fifth switching element 14 and the sixth switching element 15, and the other terminal is connected to the connection point of the first secondary winding 53c and the second secondary winding 53d. The voltage rectified by the fifth switching element 14 and the sixth switching element 15 is smoothened by the inductance device 16 and the smoothing capacitor 17, and this voltage is output as an output voltage Vout across output terminals 18a and 18b. The electrostatic capacitance of the smoothing capacitor 17 is sufficiently large, whereby a stabilized output voltage Vout is output across the output terminals 18a and 18b.

A load 19 is connected across the output terminals 18a and 18b, and consumes electric power. The two input terminals of a PWM circuit 20 are connected to the output terminals 18a and 18b, respectively, and the PWM circuit 20 compares the output voltage Vout with its internal reference voltage. Depending on the error amplification signal obtained as the result of the comparison, the PWM circuit 20 generates a PWM signal and applies the signal to a distribution circuit 21. The distribution circuit 21 alternately distributes and outputs the PWM signal to two outputs. A first inverter 22 and a second inverter 23 invert the two output signals of the distribution circuit 21, respectively, and output the signals as a first inverter output and a second inverter output, respectively. A first driving circuit 54 and a second driving circuit 55 generate signals for turning on/off the first switching device 45 and the second switching device 47, respectively depending on the output of the distribution circuit 21. A first high side driving circuit 56 and a second high side driving circuit 57 generate signals for turning on/off the third switching device 49 and the fourth switching device 51 depending on the outputs of the first and second inverters 22 and 23, respectively.

A first insulated driving-circuit 28 and a second insulated driving-circuit 29 generate signals for turning on/off the fifth switching element 14 and the sixth switching element 15, respectively depending on the outputs of the second and first inverters, respectively, and apply the signals while being insulated by a transformer or the like. The on-signals output from the first driving circuit 54, the second driving circuit 55, the first high side driving circuit 56, the second high side driving circuit 57, the first insulated driving-circuit 28 and the second insulated driving-circuit 29 have a delay time required for attaining zero-voltage switching described later. This generates a very short rest period T during which each switching device is off.

As shown in the circuit diagram of FIG. 4, the present embodiment differs from the first embodiment in that the basic converter for applying a rectangular wave voltage to the transformer 53 is a push-pull-type, and that the switching sections for short-circuiting the primary winding 53a of the transformer 53 are the third switching section 49a and the fourth switching section 51a or the first switching section 45a and the second switching section 47a. The basic operation of the present embodiment is the same as that of the synchronous-rectification-type switching power supply apparatus of the first embodiment, and the descriptions of the operation are omitted to prevent overlaps.

In the present embodiment, the series circuit of the first primary winding 53a and the second primary winding 53b of the transformer 53 is short-circuited by the third switching section 49a and the fourth switching section 51a. Since the first and second primary windings 53a and 53b are connected in series with each other, the current at the time of the short circuit becomes half.

[Fourth embodiment]

Figure 5:
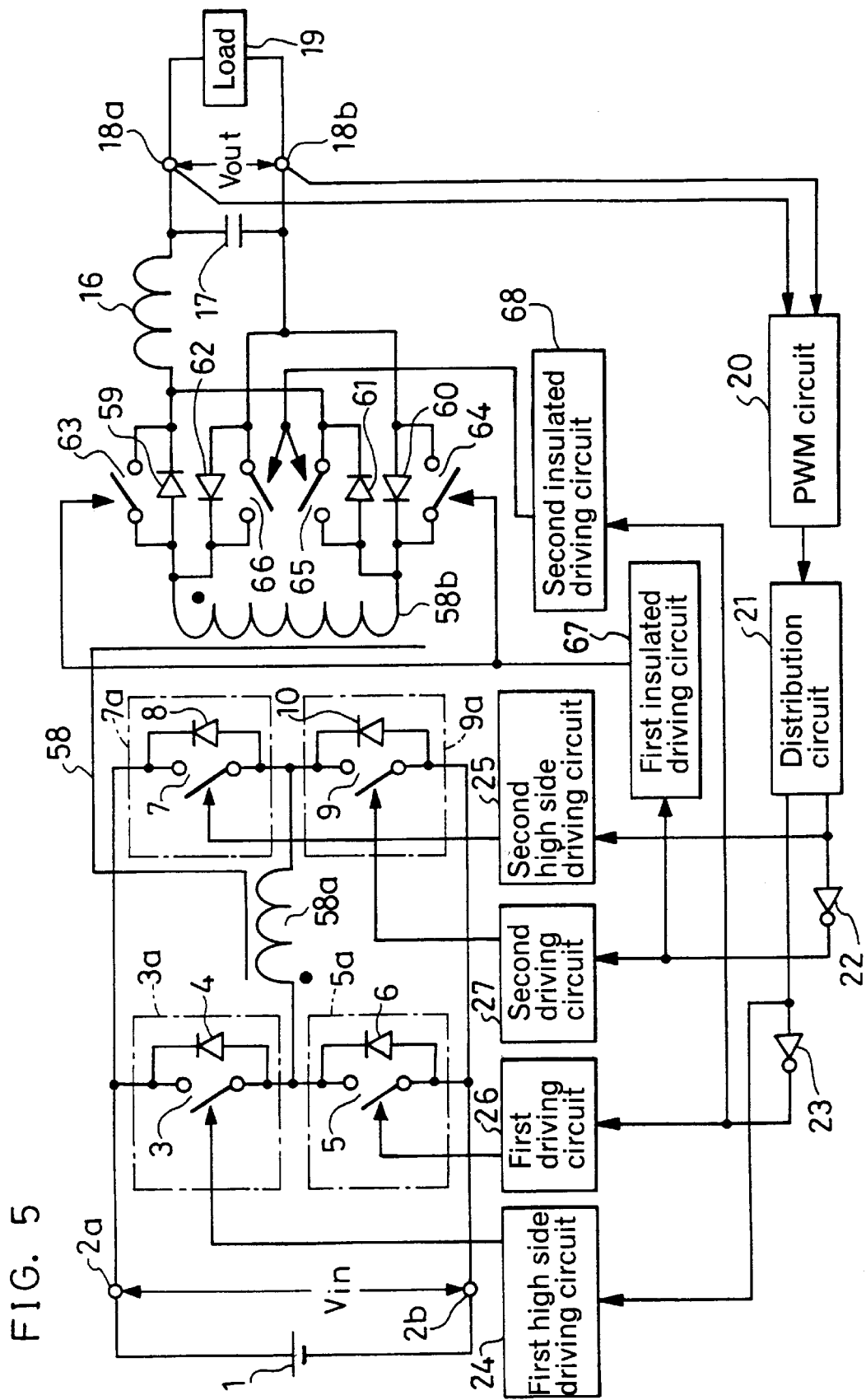
FIG. 5 is a circuit diagram of a switching power supply apparatus in accordance with a fourth embodiment of the present invention.
Figure 6:
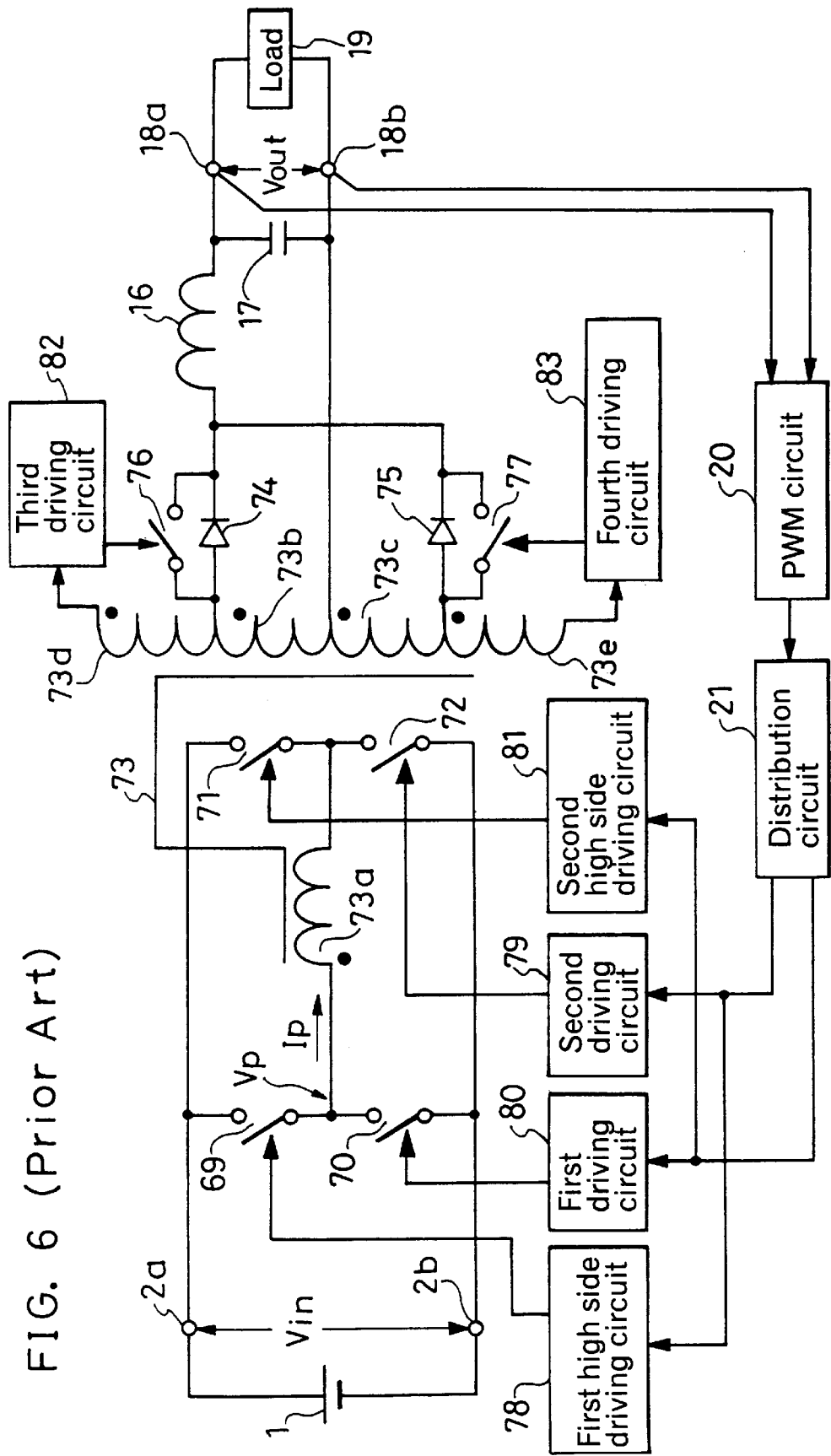
FIG. 6 is a circuit diagram of a conventional switching power supply apparatus.
Figures 7A, 7B, 7C, 7D, 7E, 7F, 7G, 7H, 7I, 7J:
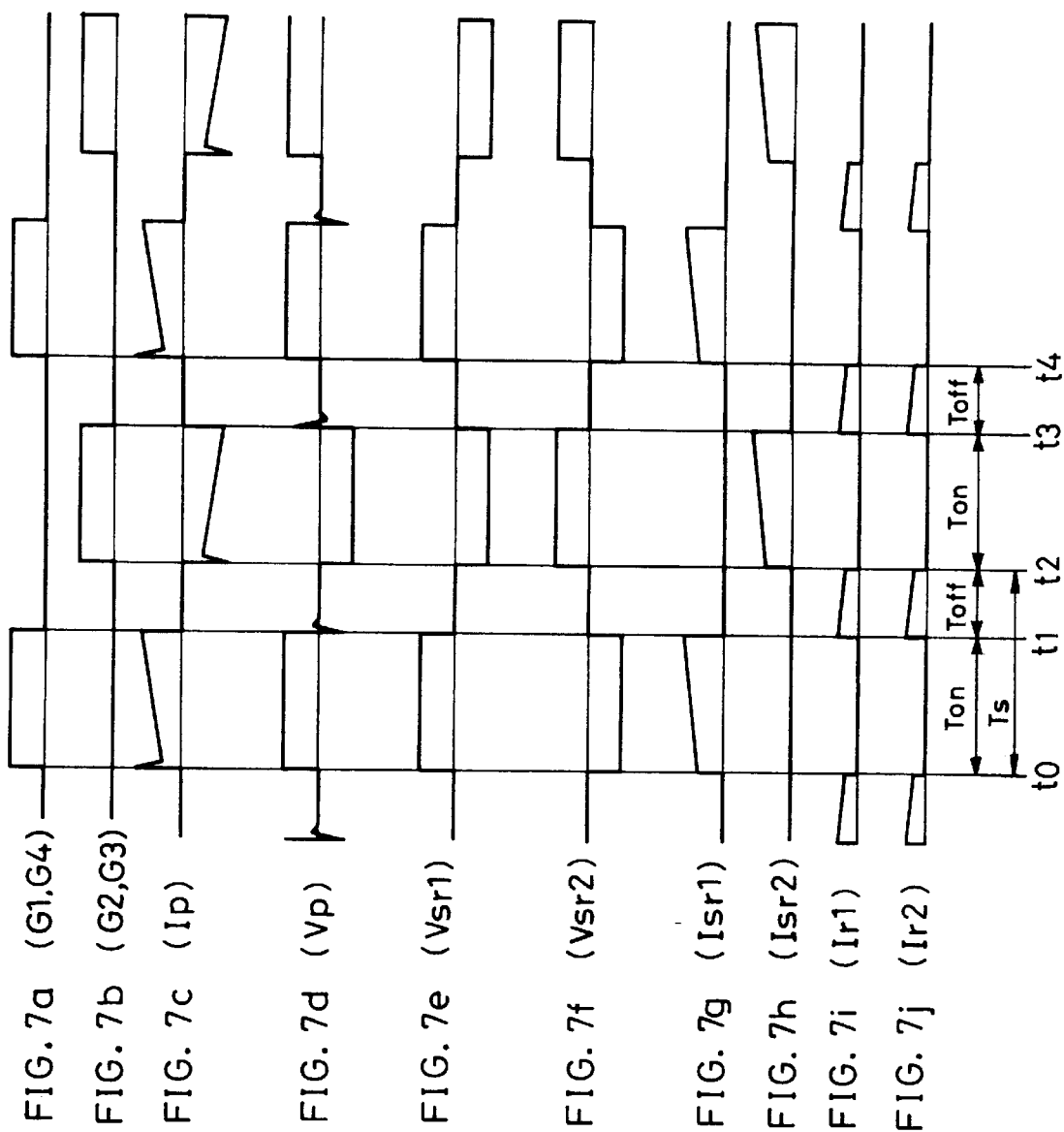
FIG. 7a to FIG. 7j show the waveforms of signals, voltages and currents at the relevant parts of the conventional switching power supply apparatus during the operation thereof.

FIG. 5 is a circuit diagram showing the configuration of a switching power supply apparatus in accordance with a fourth embodiment of the present invention. Referring to FIG. 5, the voltage value of an input DC power supply 1 is assumed to be Vin. The input DC power supply 1 is connected across input terminals 2a and 2b. A first switching element 3 and a first diode 4 constitute a first switching section 3a. A second switching element 5 and a second diode 6 constitute a second switching section 5a. The series circuit of the first switching section 3a and the second switching section 5a is connected across the input terminals 2a and 2b. A third switching element 7 and a third diode 8 constitute a third switching section 7a. A fourth switching element 9 and a fourth diode 10 constitute a fourth switching section 9a. The series circuit of the third switching section 7a and the fourth switching section 9a is also connected across the input terminals 2a and 2b. A transformer 58 has a primary winding 58a and a secondary winding 58b. The turn ratio of the windings is assumed to be N:1. One terminal of the primary winding 58a of the transformer 58 is connected to the connection point of the first switching section 3a and the second switching section 5a, and the other terminal is connected to the connection point of the third switching section 7a and the fourth switching section 9a.

A first rectifying diode 59 and a second rectifying diode 60 are connected to rectify the voltage induced at the secondary winding 58b of the transformer 58 at the time when the first switching section 3a and the fourth switching section 9a are on. A third rectifying diode 61 and a fourth rectifying diode 62 are connected to rectify the voltage induced at the secondary winding 58b of the transformer 58 at the time when the second switching section 5a and the third switching section 7a are on. A fifth switching device 63 is connected in parallel with the first rectifying diode 59, and a sixth switching device 64 is connected in parallel with the second rectifying diode 60. A fifth switching device 63 and a sixth switching device 64 constitute a synchronous rectifying circuit that turns on/off in synchronization with the operation of the fourth switching element 9. A seventh switching device 65 is connected in parallel with the third rectifying diode 61, and an eighth switching device 66 is connected in parallel with the fourth rectifying diode 62. The seventh switching device 65 and the eighth switching device 66 constitute a synchronous rectifying circuit that turns on/off in synchronization with the operation of the third switching element 7.

An inductance device 16 is connected in series with a smoothing capacitor 17. One terminal of this series circuit is connected to the connection point of the fifth switching device 63 and the seventh switching device 65, and the other terminal is connected to the connection point of the sixth switching device 64 and the eighth switching device 66. The voltage rectified by the fifth switching device 63 and the sixth switching device 64 is smoothened and output across output terminals 18a and 18b. The electrostatic capacitance of the smoothing capacitor 17 is sufficiently large, whereby a stabilized output voltage Vout is output across the output terminals 18a and 18b. A load 19 is connected across the output terminals 18a and 18b, and consumes electric power. The two input terminals of a PWM circuit 20 are connected to the output terminals 18a and 18b, respectively, and the PWM circuit 20 compares the output voltage Vout with its internal reference voltage. Depending on the error amplification signal obtained as the result of the comparison, the PWM circuit 20 generates a PWM signal and applies the signal to a distribution circuit 21.

The distribution circuit 21 alternately distributes and outputs the PWM signal to two outputs. A first inverter 22 and a second inverter 23 invert the two output signals of the distribution circuit 21, respectively, and output the signals as a first inverter output and a second inverter output, respectively. A first high side driving circuit 24 and a second high side driving circuit 25 are formed of a semiconductor device or a driving transformer, and generate signals for turning on/off the first switching element 3 and the third switching element 7 depending on the output of the distribution circuit 21. A first driving circuit 26 and a second driving circuit 27 generate signals for turning on/off the second switching element 5 and the fourth switching element 9 depending on the outputs of the second and first inverters 23 and 22, respectively. A first insulated driving-circuit 67 insulated by a transformer or the like generates on/off signals for driving the fifth switching device 63 and the sixth switching device 64 at the same timing depending on the output of the first inverter 22.

A second insulated driving-circuit 68 insulated by a transformer or the like generates on/off signals for driving the seventh switching device 65 and the eighth switching device 66 at the same timing depending on the output of the first inverter 23. The on signals output from the first high side driving circuit 24, the second high side driving circuit 25, the first driving circuit 26, the second driving circuit 27, the first insulated driving-circuit 67 and the second insulated driving-circuit 68 have a delay time required for attaining zero-voltage switching described later. This generates a very short rest period T during which each switching device is off.

Referring to FIG. 5, the present embodiment is characterized in that the transformer has one secondary winding, and that the synchronous rectifying circuit comprises four switching devices. The operation of the present embodiment will be described below. When the first switching section 3a and the fourth switching section 9a turn on, the fifth switching device 63 and the sixth switching device 64 are turned on by the voltage generating at the secondary winding 58b. In addition, when the second switching section 5a and the third switching section 7a turn on, the seventh switching device 65 and the eighth switching device 66 are turned on. When the second switching section 5a and the fourth switching section 9a turn on, the fifth switching device 63, the sixth switching device 64, the seventh switching device 65 and the eighth switching 66 are controlled to turn on. Except for the above-mentioned operation for rectifying the voltage generating at the secondary winding 58b of the transformer 58, the operation of the present embodiment is the same as that of the circuit of the first embodiment shown in FIG. 1, and the descriptions of the operation are omitted.

The present embodiment can also offer the effect of synchronous rectification, and does not cause any loss due to the short circuit of the parasitic capacitor existing in parallel with each switching device. In addition, the energy stored in the leak inductance of the transformer can be used effectively. For this reason, the efficiency of the power supply apparatus can be improved significantly. The second switching element 5, the seventh switching device 65 and the eighth switching device 66 can be turned on at the same timing, and the fourth switching element 9, the fifth witching device 63 and the sixth switching device 64 can also be turned on at the same timing, whereby the control circuits can be configured simply. A full-bridge-type rectifying circuit is taken as an example and explained in the above-mentioned descriptions. However, even if the rectifying circuit is a half-bridge type or a push-pull type, that is, even if the rectifying circuits shown in FIG. 3 and FIG. 4 have the same configuration as that of the rectifying circuit shown in FIG. 5, the operation is substantially the same.

What is claimed is:

1. A switching power supply apparatus comprising:
a series circuit of a first switching section and a second switching section complementarily repeating on/off operation and having a rest period during which both said switching sections are off, said series circuit being connected to an input power supply,
a series circuit of a third switching section and a fourth switching section complementarily repeating on/off operation and having a rest period during which both said switching sections are off, said series circuit being connected to said input power supply,
a transformer having a primary winding, and a first secondary winding and a second secondary winding connected in series with each other, said primary winding being connected between the connection point of said first switching section and said second switching section and the connection point of said third switching section and said fourth switching section;
a fifth switching section turning on/off in synchronization with the operation of said second switching section to rectify the voltage generated at said first secondary winding of said transformer;
a sixth switching section turning on/off in synchronization with the operation of said fourth switching section to rectify the voltage generated at said second secondary winding;
a smoothing circuit for smoothing said rectified voltage;
a control section for controlling an output voltage (Vout) by controlling the on/off ratio of said first switching section and the on/off ratio of said third switching section; and
a control section for turning on said second switching section and said fourth switching section in order to short-circuit said primary winding of said transformer in a period during which both said first switching section and said second switching section are off except for said rest period.

2. A switching power supply apparatus comprising:
a series circuit of a first switching section and a second switching section complementarily repeating on/off operation and having a rest period during which both said switching sections are off, said series circuit being connected to an input power supply,
a series circuit of a third switching section and a fourth switching section complementarily repeating on/off operation and having a rest period during which both said switching sections are off, said series circuit being connected to said input power supply,
a transformer having a primary winding and a secondary winding, said primary winding being connected between the connection point of said first switching section and said second switching section and the connection point of said third switching section and said fourth switching section;
a fifth switching section and a sixth switching section turning on/off in synchronization with the operation of said second switching section to rectify the positive voltage generated at said secondary winding of said transformer;
a seventh switching section and an eighth switching section turning on/off in synchronization with the operation of said fourth switching section to rectify the negative voltage generated at said secondary winding of said transformer;
a smoothing circuit for smoothing said rectified voltages;
a control section for controlling an output voltage by changing the on/off ratio of said first switching section and the on/off ratio of said third switching section, respectively; and a control section for controlling said second switching section and said fourth switching section in order to short-circuit said primary winding of said transformer in a period during which both said first switching section and said second switching section are off except for said rest period.

3. A switching power supply apparatus comprising:
a series circuit of a first switching section and a second switching section repeating on/off operation alternately, said series circuit being connected to an input power supply,
a series circuit of a first capacitor and a second capacitor, said series circuit being connected to said input power supply,
a transformer having a primary winding and an auxiliary winding, and also having a first secondary winding and a second secondary winding connected in series with each other, said primary winding being connected between the connection point of said first switching section and said second switching section and the connection point of said first capacitor and said second capacitor;
a third switching section connected between one terminal of said auxiliary winding and said input power supply, and repeating on/off operation complementarily to said first switching section, and having a short rest period during which both said switching sections are off;
a fourth switching section connected between the other terminal of said auxiliary winding and said input power supply, and repeating on/off operation complementarily to said second switching section, and having a short rest period during which both said switching sections are off;
a fifth switching section turning on/off in synchronization with the operation of said third switching section to rectify the voltage generating at said first secondary winding of said transformer;
a sixth switching section turning on/off in synchronization with the operation of said fourth switching section to rectify the voltage generating at said second secondary winding;
a smoothing circuit for smoothing said rectified voltage;
a control section for controlling an output voltage by changing the on/off ratio of said first switching section and the on/off ratio of said second switching section, respectively; and
a control section for controlling said third switching section and said fourth switching section in order to short-circuit said auxiliary winding of said transformer in a period during which both said first switching section and said second switching section are off except for said short rest period.

4. A switching power supply apparatus comprising:
a series circuit of a first switching section and a second switching section repeating on/off operation alternately, said series circuit being connected in series with an input power supply,
a series circuit of a first capacitor and a second capacitor, said series circuit being connected to said input power supply,
a transformer having a primary winding, an auxiliary winding and a secondary winding, said primary winding being connected between the connection point of said first switching section and said second switching section and the connection point of said first capacitor and said second capacitor;

a third switching section connected between said auxiliary winding of said transformer and said input power supply, complementarily repeating on/off operation to said first switching section, and having a short rest period during which both said switching sections are off;
a fourth switching section that is connected between said auxiliary winding and said input power supply, complementarily repeating on/off operation to said second switching section, and having a short rest period during which both said switching sections are off;
a fifth switching section and a sixth switching section connected to said secondary winding of said transformer and turning on/off in synchronization with the operation of said third switching section to rectify the positive voltage generated at said secondary winding;
a seventh switching section and an eighth switching section connected to said secondary winding of said transformer and turning on/off in synchronization with the operation of said fourth switching section to rectify the negative voltage generated at said secondary winding;
a smoothing circuit for smoothing said rectified voltages;
a control section for controlling an output voltage by changing the on/off ratio of said first switching section and the on/off ratio of said second switching section, respectively; and
a control section for controlling said third switching section and said fourth switching section in order to short-circuit said auxiliary winding of said transformer in a period during which both said first switching section and said second switching section are off except for said short rest period.

5. A switching power supply apparatus in accordance with claim 3, wherein said primary winding is used as an auxiliary winding.

6. A switching power supply apparatus in accordance with claim 4, wherein said primary winding is used as an auxiliary winding.

7. A switching power supply apparatus comprising:
a first switching section and a second switching section repeating on/off operation alternately;
a third switching section complementarily repeating on/off operation to said first switching section, and having a short rest period during which both said switching sections are off;
a fourth switching section complementarily repeating on/off operation to said second switching section, and having a short rest period during which both said switching sections are off;
a transformer having a first primary winding and a second primary winding, and also having a first secondary winding and a second secondary winding connected in series with each other;
a series circuit of said first primary winding of said transformer and said first switching section, said series circuit being connected to an input power supply, and a series circuit of said second primary winding of said transformer and said second switching section, said series circuit being connected to said input power supply,
a series circuit comprising said third switching section and said fourth switching section and connected to a series circuit comprising said first primary winding and said second primary winding of said transformer;

a fifth switching section turning on/off in synchronization with the operation of said third switching section to rectify the voltage generating at said first secondary winding of said transformer;

a sixth switching section turning on/off in synchronization with the operation of said fourth switching section to rectify the voltage generating at said second secondary winding;

a smoothing circuit for smoothing said rectified voltages;

a control section for controlling an output voltage by changing the on/off ratio of said first switching section and the on/off ratio of said second switching section; and a control section for controlling said third switching section and said fourth switching section in order to short-circuit the series circuit of said first primary winding and said second primary winding of said transformer in a period during which both said first switching section and said second switching section are off except for said short rest period.

8. A switching power supply apparatus comprising:

a first switching section and a second switching section repeating on/off operation alternately;

a third switching section complementarily repeating on/off operation to said first switching section, and having a short rest period during which both said switching sections are off;

a fourth switching section complementarily repeating on/off operation to said second switching section, and having a short rest period during which both said switching sections are off;

a transformer having a first primary winding, a second primary winding and a secondary winding;

a series circuit of said first primary winding of said transformer and said first switching section, said series circuit being connected to an input power supply, and a series circuit of said second primary winding of said transformer and said second switching section, said series circuit being connected to said input power supply, a series circuit comprising said third switching section and said fourth switching section, and connected to a series circuit comprising said first primary winding and said second primary winding of said transformer;

a fifth switching section and a sixth switching section turning on/off in synchronization with the operation of said third switching section to rectify the positive voltage generated at said secondary winding of said transformer;

a seventh switching section and an eighth switching section turning on/off in synchronization with the operation of said fourth switching section to rectify the negative voltage generated at said secondary winding of said transformer;

a smoothing circuit for smoothing said rectified voltages;

a control section for controlling an output voltage depending on the on/off ratio of said first switching section and the on/off ratio of said second switching section; and a control section for controlling said third switching section and said fourth switching section in order to short-circuit said series circuit of said first primary winding and said second primary winding of said transformer in a period during which both said first switching section and said second switching section are off except for said short rest period.

9. A switching power supply apparatus in accordance with claim 1, wherein said switching sections each comprise a diode and a switch having control electrodes.

10. A switching power supply apparatus in accordance with claim 2, wherein said switching sections each comprise a diode and a switch having control electrodes.

11. A switching power supply apparatus in accordance with claim 3, wherein said switching sections each comprise a diode and a switch having control electrodes.

12. A switching power supply apparatus in accordance with claim 4, wherein said switching sections each comprise a diode and a switch having control electrodes.

13. A switching power supply apparatus in accordance with claim 5, wherein said switching sections each comprise a diode and a switch having control electrodes.

14. A switching power supply apparatus in accordance with claim 6, wherein said switching sections each comprise a diode and a switch having control electrodes.

15. A switching power supply apparatus in accordance with claim 7, wherein said switching sections each comprise a diode and a switch having control electrodes.

16. A switching power supply apparatus in accordance with claim 8, wherein said switching sections each comprise a diode and a switch having control electrodes.

17. A switching power supply apparatus in accordance with claim 1, wherein said switching sections each comprise a MOS FET.

18. A switching power supply apparatus in accordance with claim 2, wherein said switching sections each comprise a MOS FET.

19. A switching power supply apparatus in accordance with claim 3, wherein said switching sections each comprise a MOS FET.

20. A switching power supply apparatus in accordance with claim 4, wherein said switching sections each comprise a MOS FET.

21. A switching power supply apparatus in accordance with claim 5, wherein said switching sections each comprise a MOS FET.

22. A switching power supply apparatus in accordance with claim 6, wherein said switching sections each comprise a MOS FET.

23. A switching power supply apparatus in accordance with claim 7, wherein said switching sections each comprise a MOS FET.

24. A switching power supply apparatus in accordance with claim 8, wherein said switching sections each comprise a MOS FET.

25. A switching power supply apparatus in accordance with claim 1, comprising a control section for changing a short rest period depending on a load current.

26. A switching power supply apparatus in accordance with claim 2, comprising a control section for changing a short rest period depending on a load current.

27. A switching power supply apparatus in accordance with claim 3, comprising a control section for changing a short rest period depending on a load current.

28. A switching power supply apparatus in accordance with claim 4, comprising a control section for changing a short rest period depending on a load current.

29. A switching power supply apparatus in accordance with claim 5, comprising a control section for changing a short rest period depending on a load current.

30. A switching power supply apparatus in accordance with claim 6, comprising a control section for changing a short rest period depending on a load current.

31. A switching power supply apparatus in accordance with claim 7, comprising a control section for changing a short rest period depending on a load current.

32. A switching power supply apparatus in accordance with claim 8, comprising a control section for changing a short rest period depending on a load current.

33. A switching power supply apparatus in accordance with claim 1, wherein the turn-off timing of said fifth switching section and that of said sixth switching section are changed depending on a load current.

34. A switching power supply apparatus in accordance with claim 2, wherein the turn-off timing of said fifth switching section and that of said sixth switching section are changed depending on a load current.

35. A switching power supply apparatus in accordance with claim 3, wherein the turn-off timing of said fifth switching section and that of said sixth switching section are changed depending on a load current.

36. A switching power supply apparatus in accordance with claim 4, wherein the turn-off timing of said fifth switching section and that of said sixth switching section are changed depending on a load current.

37. A switching power supply apparatus in accordance with claim 5, wherein the turn-off timing of said fifth switching section and that of said sixth switching section are changed depending on a load current.

38. A switching power supply apparatus in accordance with claim 6, wherein the turn-off timing of said fifth switching section and that of said sixth switching section are changed depending on a load current.

39. A switching power supply apparatus in accordance with claim 7, wherein the turn-off timing of said fifth switching section and that of said sixth switching section are changed depending on a load current.

40. A switching power supply apparatus in accordance with claim 8, wherein the turn-off timing of said fifth switching section and that of said sixth switching section are changed depending on a load current.

* * * * *